(12) United States Patent
Ostrikov et al.

(10) Patent No.: US 11,249,689 B2
(45) Date of Patent: *Feb. 15, 2022

(54) MEMORY DEVICE RESILIENT TO CYBER-ATTACKS AND MALFUNCTION

(71) Applicant: Cypress Semiconductor Corporation, San Jose, CA (US)

(72) Inventors: Sergey Ostrikov, Redwood City, CA (US); Stephan Rosner, Campbell, CA (US); Avi Avanindra, Santa Clara, CA (US); Hans Van Antwerpen, Mountain View, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/066,599

(22) Filed: Oct. 9, 2020

(65) Prior Publication Data

US 2021/0223995 A1 Jul. 22, 2021

Related U.S. Application Data

(63) Continuation of application No. 16/829,838, filed on Mar. 25, 2020, now Pat. No. 10,809,944.

(Continued)

(51) Int. Cl.
*G06F 12/00* (2006.01)
*G06F 3/06* (2006.01)

(Continued)

(52) U.S. Cl.
CPC .......... *G06F 3/0659* (2013.01); *G06F 3/0604* (2013.01); *G06F 3/0679* (2013.01);
(Continued)

(58) Field of Classification Search
CPC .... G06F 3/0659; G06F 3/0604; G06F 3/0679; G06F 12/10; G06F 21/554; G06F 21/78;
(Continued)

(56) References Cited

U.S. PATENT DOCUMENTS

2015/0100722 A1* 4/2015 Webster ............... B60L 15/2009
711/104

OTHER PUBLICATIONS

International Search Report for International application No. PCT/US2021/013969 dated Feb. 25, 2021, 2 pages.
(Continued)

*Primary Examiner* — Gurtej Bansal

(57) ABSTRACT

A non-volatile memory (NVM) integrated circuit device includes an NVM array of memory cells partitioned into a first physical region to store a first firmware stack and a second physical region to store a second firmware stack. The NVM integrated circuit device also includes a processing device that enables a host microcontroller to execute in place the first firmware stack stored within a first set of logical addresses that is mapped to the first physical region. The processing device tracks accesses, by the host microcontroller, to the first set of logical addresses. The processing device, in response to detecting one of a certain number or a certain type of the accesses by the host microcontroller, initiates a recovery operation including to remap the first set of logical addresses to the second physical region.

20 Claims, 6 Drawing Sheets

Related U.S. Application Data

(60) Provisional application No. 62/964,271, filed on Jan. 22, 2020.

(51) Int. Cl.
*H04L 9/32* (2006.01)
*G06F 21/78* (2013.01)
*G06F 12/10* (2016.01)
*G06F 21/55* (2013.01)

(52) U.S. Cl.
CPC ............ *G06F 12/10* (2013.01); *G06F 21/554* (2013.01); *G06F 21/78* (2013.01); *H04L 9/321* (2013.01); *H04L 9/3236* (2013.01); *G06F 2212/657* (2013.01); *G06F 2221/033* (2013.01)

(58) Field of Classification Search
CPC ......... G06F 2212/657; G06F 2221/033; H04L 9/321; H04L 9/3236
See application file for complete search history.

(56) References Cited

OTHER PUBLICATIONS

Written Opinion of the International Searching Authority for International application No. PCT/US2021/013969 dated Feb. 25, 2021, 3 pages.

\* cited by examiner

MEMORY DEVICE RESILIENT TO CYBER-ATTACKS AND MALFUNCTION

RELATED APPLICATIONS

This application is a Continuation application to U.S. Non-Provisional patent application Ser. No. 16/829,838, filed Mar. 25, 2020 which claims the benefit of U.S. Provisional Patent Application No. 62/964,271, filed Jan. 22, 20192020, all of which are incorporated herein by reference in their entirety.

TECHNICAL FIELD

The disclosure relates to the field of memory devices, and in particular, to a memory device that is resilient to cyber-attacks and malfunction.

BACKGROUND

Cyber-attacks often target firmware stacks in computing systems. Execution of such firmware stacks performs particular functions, such as control and communication. Firmware stacks are often stored in stand-alone high-density flash devices. If a network attack or malfunction corrupts information in flash (or other integrated circuit based) memory that is needed for recovery, the system may not be able to be restored. This may result in a micro-controller unit (MCU) (or host microcontroller) without embedded flash, e.g., making the system unrecoverable without offline manual intervention.

Embedded Flash (eFlash) memory is a key enabling technology for many programmable semiconductor products that require small form factor and low-power processing. For example, microcontrollers may use eFlash to store program instructions (code) as well as data on which processing is performed. Other types of integrated circuit memory are envisioned.

BRIEF DESCRIPTION OF THE DRAWINGS

The disclosure is illustrated by way of example, and not of limitation, in the figures of the accompanying drawings.

DETAILED DESCRIPTION

Figure 1A:
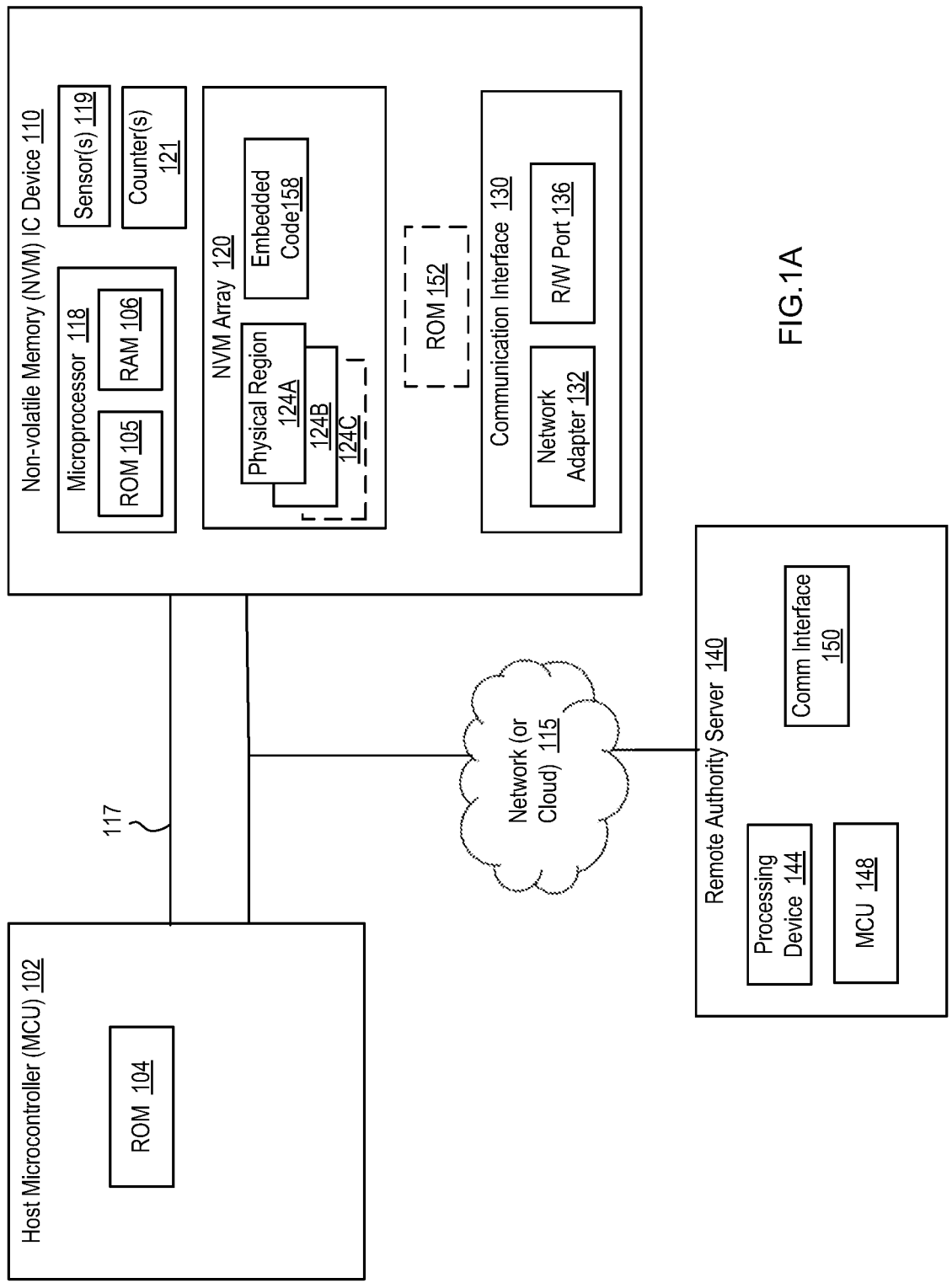
FIG. 1A is a block diagram of a system that employs a non-volatile memory (NVM) integrated circuit (IC) device that includes an NVM array of memory cells according to various embodiments.

In some embodiments, efforts to secure embedded memory of a memory controller unit within a host microcontroller (e.g., MCU) from attack are made via cryptographic methods. Such cryptographic methods may include, for example, using a secure protocol communication session between a server and a non-volatile memory (NVM) device. The secure protocol may be, for example, one of secure sockets layer (SSL) protocol or transport layer security (TLS) protocol. This allows the NVM device to directly authenticate the server, e.g., only accepts updates from a trusted server, via secure protocols that facilitate mutual authentication.

Due to the fact that a cyber-attack can by-pass the host microcontroller, there is a need to secure communication with the host microcontroller as well as separately secure communication with the NVM device itself. This increases the number of attack surfaces, making it difficult and processing intensive to treat both the host microcontroller and the NVM device as separate communication nodes. Further, use of cryptographic methods do not address the possibility of corruption or other malfunction of a firmware stack, other than to the lose connection necessary for the secure communication, and again requiring manual intervention. An unrecoverable system requiring manual intervention may be undesirable for an embedded memory type control device in a vehicle, airplane, or industrial equipment, for example.

The present disclosure addresses the above deficiencies (and other deficiencies that will be discussed below in more detail) by storing multiple copies of a firmware stack on different partitions of an NVM array of memory cells in an NVM integrated circuit device. For example, an actively processed firmware stack may be stored in a first physical region, to which is mapped a first set of logical addresses accessible by the host microcontroller. Further by way of example, an inactive firmware stack (e.g., copy of a second firmware stack) may be stored in a second physical region, to which is mapped a second set of logical addresses. Each of these firmware stacks may be a firmware image that is executable by the host microcontroller.

In various embodiments, the NVM integrated circuit device (e.g., a flash or other similar device) processes embedded code or employs an on-board microprocessor (e.g., processing device) to detect operation of the first firmware stack that is out of the ordinary or that detects accesses, of the first set of logical addresses, by the host microcontroller that are beyond a certain number. When such activity is detected, a possible attack is also detected, and the NVM integrated circuit device can trigger a recovery operation that includes a swap of the first firmware stack with the second firmware stack that is exposed to the host microcontroller for execution. This swap may be performed by remapping the first set of logical addresses to the second physical region where the second firmware stack is stored, e.g., so that the host microcontroller is to instead execute the second firmware stack. This second firmware stack may include limited functionality to the host microcontroller during a recovery operation, which is to resolve an unexpected event detected during the execution of the first firmware stack. In one embodiment, the NVM integrated circuit device may securely communicate with a remote authority server for the limited purpose of resetting the first firmware stack so that operation can be swapped back to the first firmware stack.

In a further embodiment, the NVM array of memory cells may be further partitioned to include a third physical region in which is stored a third firmware stack. This third firmware stack may be an original image of the firmware stack for operation by the host microcontroller, but that is not accessible by the host microcontroller. In one embodiment, the third firmware stack is write protectable, and thus resilient to attack or corruption. The microprocessor (or the embedded code) of the NVM integrated circuit device may further, before remapping the first set of logical addresses to the second physical region, replace the second firmware stack with a third firmware stack that is stored in the third physical region. This action may ensure that the second firmware stack that is exposed for execution by the host microcontroller, in response to an unexpected event, is a known safe firmware image for device operation.

The disclosed solutions may operate seamlessly in the automotive and industrial systems that are a target of attacks due to the security critical operations they manage. The disclosed solution may be completely internal to the NVM integrated circuit device that stores firmware for an embedded system. In embodiments, the NVM integrated circuit device may operate autonomously to restore the system upon detection of attacks or can communicate with a remote server for recovery.

This type of autonomous security within the NVM integrated circuit device may avoid the need to automatically or always connect to a remote authority server, and thus reduce attack surfaces. Further, detection of an attack and recovery operations can be off-loaded from the host microcontroller to the NVM integrated circuit device, and are thus more efficiently handled. The disclosed embodiments also provide internal recovery operation capability that may keep a stand-alone, low profile power device secure in the field and less likely to become inoperable without manual intervention. Further, the disclosed embodiments may protect recovery firmware required to perform firmware over the air updates (e.g., secure boot, attestation, network stack), from the host microcontroller. These and additional advantages will be apparent to one of ordinary skill in the art in view of the following description.

FIG. 1A is a block diagram of a system 100 that employs a non-volatile memory (NVM) integrated circuit (IC) device 110 that includes an NVM array of memory cells, or NVM array 120 for simplicity, according to various embodiments. The system 100 may further include a host microcontroller 102 (or MCU) that may execute a firmware stack stored in the NVM array 120, where the NVM array 120 may also be or include a user array of memory cells available for writing data. The system 100 may further include a remote authority server 140 communicatively coupled to the host microcontroller 102 and the NVM IC device 110 via a network 115 or the cloud. In one embodiment, the system 100 is integrated within a distributed computing and control system of a vehicle, airplane, or other more extensive operation device.

The host microcontroller 102 may include a read only memory (ROM) 104, but otherwise be lightweight and primarily rely on executing in place the firmware stack(s) stored in the NVM array 120. For example, the host microcontroller 102 may boot up from code stored in the ROM 104 and then execute in place the firmware stack stored in the NVM array 120. In some embodiments, the host microcontroller 102 may need to lock or unlock the firmware stack depending on application requirements.

The host microcontroller 102 may be coupled to the NVM device 110 via a bus 117 such as a serial peripheral interface (SPI) bus, an inter-integrated circuit (I2C) bus, or other type of bus transfer protocol, for example. The remote authority server 140 may include a processing device 144, an microcontroller unit (MCU) 148, and a communication interface 150 with which to communicate with the host microcontroller 102 and/or the NVM IC device 110.

In various embodiments, the NVM IC device 110 may include a microprocessor 118 (e.g., processing device), one or more sensor 119, one or more counter 121 (e.g., an interval counter, a watchdog counter, and the like), the NVM array 120 of memory cells, a communication interface 130, and optionally a separate ROM 152. In this sense, the NVM IC device 110 may be an integrated system-on-a-chip device (SoC) having all of these components packaged on a single die. The microprocessor 118 may be a central processing unit (CPU) adapted to include on-board ROM 105 and random access memory (RAM) 106 in addition to processing capability to perform the functions discussed hereinafter. In various embodiments, the microprocessor 118 is a complex instruction set computing (CISC) microprocessor, reduced instruction set computing (RISC) microprocessor, very long instruction word (VLIW) microprocessor, or a processor implementing other instruction sets or processors implementing a combination of instruction sets. In alternative embodiments, the microprocessor 118 is a special-purpose processing device such as an application specific integrated circuit (ASIC), a field programmable gate array (FPGA), a digital signal processor (DSP), network processor, or the like.

In disclosed embodiments, the NVM array 120 is partitioned into multiple physical regions, including a first physical region 124A, a second physical region 124B, and an optional third physical region 124C. Additional partitions are envisioned. Either the NVM array 120, the ROM 105, or the ROM 152 may include an embedded code 158. If stored on the NVM array 120, the embedded code 158 may be located within the physical region currently mapped to the first set of logical addresses executable in place (XIP) by the host microcontroller 102. The embedded code 158 may be executed in place to perform the functions described hereinafter instead of being performed by the microprocessor 118.

The communication interface 130 may include a network adapter 132 to communicate over the network 115 and a read/write port 136 over which to be accessed by the host microcontroller 102. In one embodiment, the one or more sensor 119 may be a set of environmental sensors to detect environmental factors that may indicate a malfunction, e.g., an adverse event occur during execution in place of a firmware stack by the host microcontroller 102. Further, the one or more counter 121 may include an interval counter to track the number of accesses of the NVM array 120 (e.g., the first set of logical addresses) by the host microcontroller 102. In various embodiments, the interval counter is volatile, non-volatile, or a combination thereof. In one embodiment, the interval counter is programmed to track just a range of logical addresses identified as being of interest for purposes of a threshold number, over which recovery operations may be trigger as will be discussed in more detail.

Figure 1B:
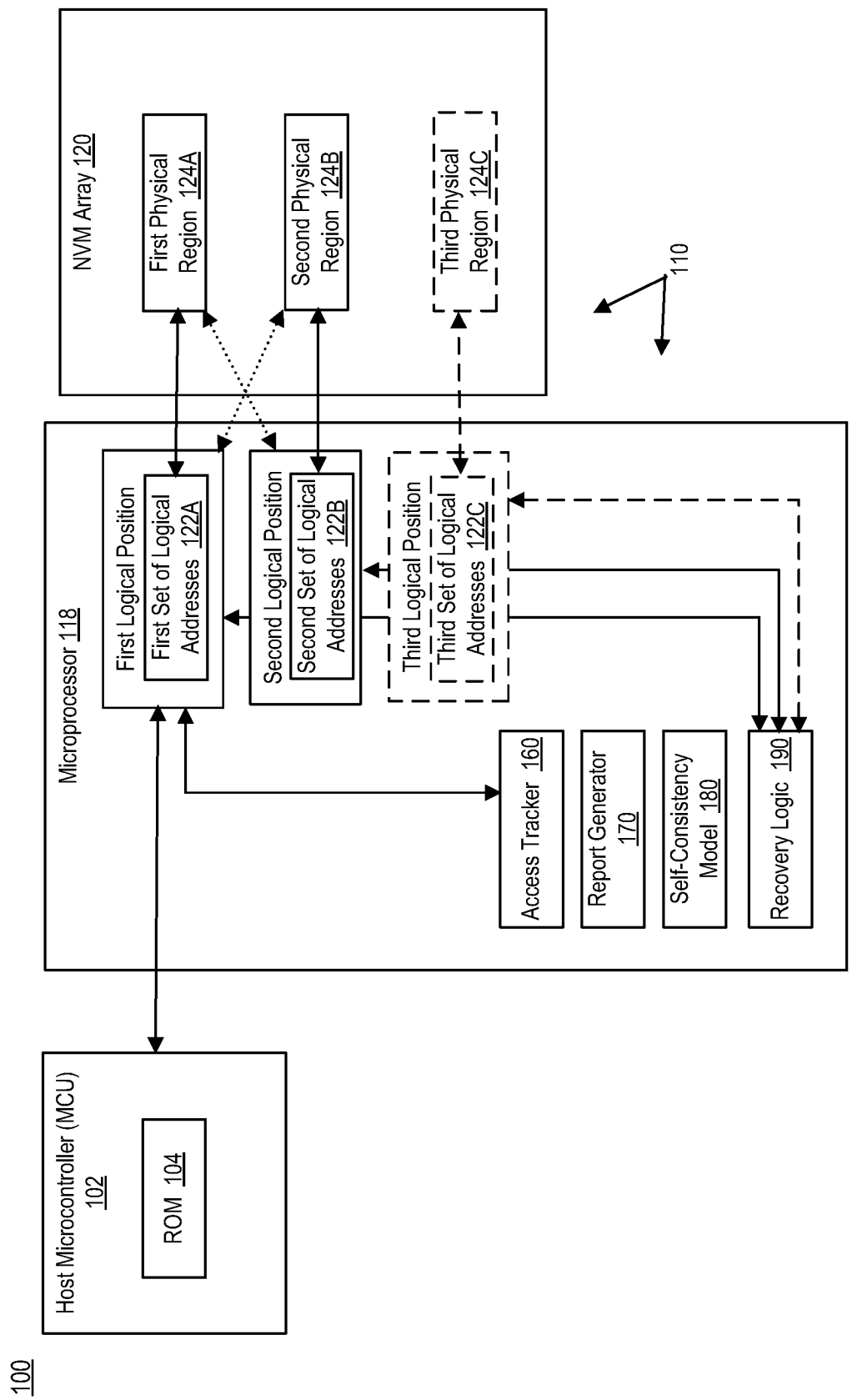
FIG. 1B is a block diagram of the system of FIG. 1A in which the NVM integrated circuit device includes a microprocessor to make the NVM integrated circuit device resilient to cyber-attack and malfunction, according to an embodiment.

FIG. 1B is a block diagram of the system 100 of FIG. 1A in which the NVM IC device 110 includes the microprocessor 118 to make the NVM integrated circuit 110 device resilient to cyber-attack and malfunction, according to an embodiment. The microprocessor 118, for example, may include an access tracker 160, a report generator 170, a self-consistency model 180, and recovery logic 190.

Figure 1C:
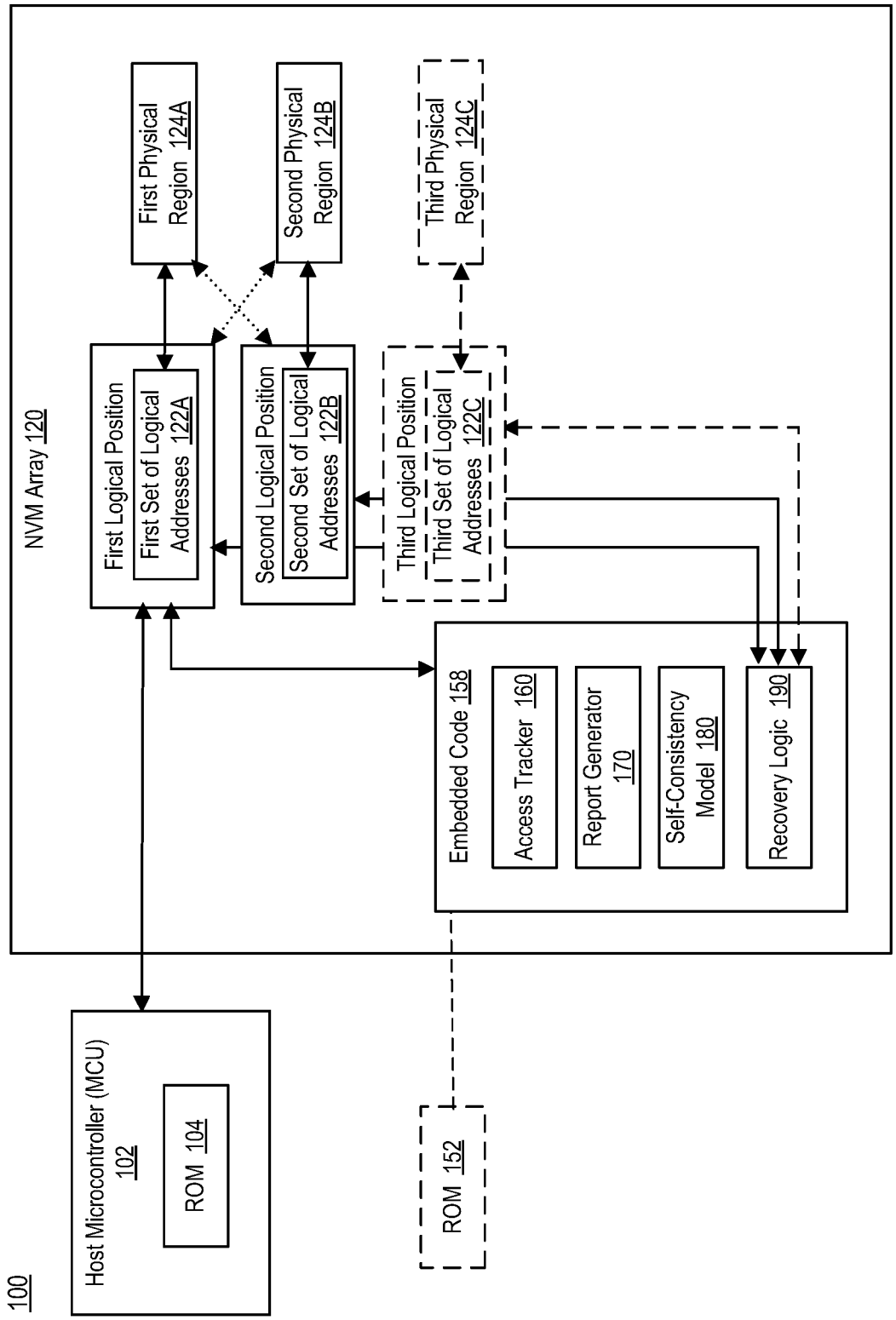
FIG. 1C is a block diagram of the system of FIG. 1A in which the NVM integrated circuit device executes embedded code to make the NVM integrated circuit device resilient to cyber-attack and malfunction, according to an embodiment.

FIG. 1C is a block diagram of the system of FIG. 1A in which the NVM integrated circuit device executes the embedded code 158 to make the NVM IC device 110 resilient to cyber-attack and malfunction, according to an embodiment. The embedded code 158, for example, may be executable to also include the access tracker 160, the report generator 170, the self-consistency model 180, and the recovery logic 190.

The following description, therefore, may be applicable to the embodiments illustrated in both FIG. 1B and FIG. 1C. In both embodiments, logical addresses that are trackable (e.g., mapped) to corresponding physical regions, may include a first set of logical addresses 122A (e.g., at a first logical position) that is mapped to the first physical region 124, a second set of logical addresses 122B (e.g., at a second logial position) that is mapped to the second physical region 124B, and an optional third set of logical addresses 122C (e.g., at a third logical position) that is mapped to the optional third physical region 124C.

As discussed previously, a first firmware stack may be stored in the first physical region 124A (e.g., at a first physical address range), a second firmware stack stored in the second physical region 124B (e.g., at a second physical address range), and a third firmware stack stored in the optional third physical region 124C (e.g., at a third physical address range). In various embodiments, whichever firmware stack is mapped to the set of logical addresses at the first logical position is the firmware stack that the host microcontroller 102 is to execute in place to operate. The host microcontroller 102 may thus initially execute in place the first firmware stack, which is mapped to the first set of logical addresses 122A. The second firmware stack, stored in the second physical region 124B, may be a copy or back up firmware stack should the first firmware stack be attacked, corrupted, or experience malfunction.

In one embodiment, the second firmware stack is a firmware image that provides limited functionality to the host microcontroller 102 during recovery operations. For example, during a recovery operation in which the host microcontroller 102 denies the NVM IC device 120 a server connection to the remote authority server 140, the recovery logic 190 can remap a set of logical addresses to a different physical region, as will be discussed later, which presents, to the host microcontroller 102, a recovery image that limits functionality of the host microcontroller 102.

In some embodiments, the third firmware stack may be an original image of the firmware stack for operation of the host microcontroller 102, but that is not accessible by the host microcontroller. For example, the third firmware stack may be a write-protected recovery firmware image. Furthermore, the third physical region 124C may be configured to securely communicate, e.g., via a cryptographically secured connection, with the remote authority server 140 for purposes of remotely and securely updating the third firmware stack, e.g., a secure firmware over-the-air (FOTA) update.

In various embodiments, the access tracker 160 can track execution of the firmware stack to which is mapped the set of logical addresses stored in the first logical position, e.g., the first set of logical addresses 122A. As illustrated, therefore, the access tracker 160 may track accesses to at least a range (e.g., sequence or certain blocks) of the logical addresses of the first set of logical addresses 122A. The report generator 170 can periodically create execution reports based on tracked accesses to the range, sequence, or blocks of interest within the first set of logical addresses 122A. The execution reports may enable performance of either local or remote analysis (e.g., monitoring) of the host microcontroller 102 early boot runtime behavior and likewise normal runtime behavior after boot.

In one embodiment, the one or more counter 121 includes an interval counter that tracks accesses, by the host microcontroller 102, to the range of logical addresses of the first set of logical addresses 122A to which set of logical addresses are in the first logical position. The report generator 170 can then create an execution report at predetermined intervals of the interval counter. In one embodiment, the execution reports are sent to the remote authority server 140, which can analyze the execution reports to determine whether or not execution behavior is one of an unapproved access by the host microcontroller 102 or a malfunction of the NVM IC device 110. The recovery logic 190 may initiate a recovery operation in response to receiving a communication from the remote authority server 140 indicating a detection, within the execution reports, of one of an unapproved access by the host microcontroller 102 or a malfunction of the NVM IC device 110.

In some embodiments, local execution reports can be generated by use of the microprocessor 118 implementing a reduced-sized neural network, which can perform machine learning of such boot or non-boot runtime behavior to be compared with abnormal runtime behavior. Such use of a neural network may result in generation of the self-consistency model 180. In other embodiments, the self-consistency model 180 is hard-coded within the logic of the microprocessor 118 or within the embedded code 158 as expected boot runtime behavior.

Accordingly, any behavior outside of the expected boot runtime behavior, including that which deviates from the self-consistency model 180, may trigger the microprocessor 118 (or the embedded code 158) to execute the recovery logic 190. More specially, the microprocessor 118 (or the embedded code 158) may compare information within the execution reports against the self-consistency model 180 and initiate the recovery operation in response to detection, within the compared information, of one of an unapproved access by the host microcontroller 102 or a malfunction of the NVM IC device 110.

In various embodiments, the recovery logic 190 is executed (or triggered) to initiate the recovery operation. To do so, the recovery logic 190 can access the NVM array 120 and remap the first set of logical addresses 122A to the second physical region 124B, resulting in remapping of the first logical position to the second physical region 124B where is stored the second firmware stack. This remapping is illustrated using a dotted line. If the second physical region 124B is larger than the first physical region 124A, it is possible that the first set of logical addresses 122A is expanded to accommodate the remapping to the larger physical region. Once the remapping takes place, the recovery logic 190 may lock the first logical position to prevent writing to the second firmware stack. During the initiation of the recovery operation, the host microcontroller 102 can still execute in place the first firmware stack. Once the remapping of the first logical position to the second physical region 124B has occurred, the host microcontroller 102 may begin execution in place of the second firmware stack stored in the second physical region 124B.

In the absence of the third firmware stack (and thus operating without the third set of logical addresses 122C and the third physical region 124C), the above remapping may be of limited use and time. The NVM IC device 110 may continue with the recovery operation by initiating a secure interaction with the remote authority server 140, to perform a FOTA update of the first firmware stack stored in the first physical region 124A. The remote authority server 140 may then do either an update or a rewrite of the first firmware stack stored in the first physical region 124A to ensure any glitching, malfunctioned, or altered FW code due to attack is fixed or replaced. Once the FOTA update is complete, the microprocessor 118 or the embedded code 158 can remap the first set of logical addresses 122A to the first physical region 124A, such that the host microcontroller 102 can again execute in place the first firmware stack stored therein. The NVM IC device 110 is then prepared for detection of another event or activity outside of normal runtime behavior that may trigger the recovery operation.

In the embodiments in which the third firmware stack is stored in the third physical region 124C, the recovery logic 190 may perform additional functions. Recall that the third firmware stack may be an original image (e.g., "golden image") of the firmware stack for operation of the host microcontroller 102, but that is not accessible by the host microcontroller. In one embodiment, the third firmware stack is a write-protected recovery firmware image.

In various embodiments, the recovery logic 190 may, before remapping the first set of logical addresses 122A to the second physical region 124B, replace the second firmware stack stored in the second physical region 124B with the third firmware stack stored in the third physical region 124C. In this way, the firmware stack that is to be executed after remapping the first set of logical addresses to the second physical region 124B is the original, unaltered firmware code (e.g., the third firmware stack). This provides a secure method of the host microcontroller 102 resuming operation using a firmware stack that has not been altered. Once the first firmware stack is updated or overwritten via FOTA operation, the recovery logic 190 can remap the first set of logical addresses 122A to the first physical region 124A to resume execution of the first firmware stack. In this way, the NVM array 120 is reset to be able to handle another unexpected or adverse event that triggers another recovery operation.

Alternatively, the recovery logic 190 may, before remapping the first set of logical addresses 122A to the second physical region 124B, perform a hash-based validation of the second firmware stack compared against the third firmware stack. This comparison may similarly ensure that the second firmware stack about to be executed is the original, unaltered firmware stack that is safe to execute. The second physical region 124B may further support secure read and write operations so that execution in place of the second firmware stack is resilient against attack during performance of the recovery operation. For example, the microprocessor 118 may secure, using cryptographic operations, read requests and write requests directed to the first set of logical addresses.

According to further embodiments, the one or more counter 121 may be a watchdog ("WD") counter that counts down an amount of accessed data. For example, the WD counter can be set to a default value (e.g., 1,000) upon boot of the NVM integrated device 110. The value of the WD counter may then be decremented for each byte read out of the NVM array 120 by the host microcontroller 102. In this way, the WD counter may track the amount of throughput of data read out of the NVM array 120 since boot up. When the WD counter reaches a zero value, the WD counter may trigger or initiate the recovery operation. A way to prevent the WD counter from triggering the recovery operation is to defer the WD counter or service the WD counter by the remote authority server 140. The deferral is an indication that the NVM IC device 110 can still communicate with the remote authority server 140, and that the remote authority server 140 has verified the integrity of the NVM array 120 for continued safe operation of the host microcontroller 102. Thus, in one embodiment, the microprocessor 118 (or the embedded code 158) may reset the WD counter to the default value during device operation only in response to a cryptographically authenticated request received from the remote authority server 140.

According to additional embodiments, the one or more sensor 119 may include sensing devices capable of detecting whether the NVM IC device 110 is out of specification, e.g., in terms of voltage, temperature, or power resets. Accordingly, the one or more sensor 119 may be analog environmental sensors. The one or more sensor 119 may detect sensed information (e.g., temperature, voltage, power resets, and the like) that are beyond a threshold value before triggering detection of an adverse event. Detection of an adverse event based on sensed information in this way may also serve to trigger a recovery operation.

For example, the one or more sensor 119 may detect an adverse event such as code execution glitches, successive power resets optionally combined with code execution glitches until a desired branch in code execution is chosen, or successive power resets after one or more incorrect password guess. Quick resets can be detected by updating a non-volatile digital monotonic counter inside of the NVM array 120 that is incremented on each power-on reset. If this monotonic counter value increases by a threshold value within a threshold period of time, the recovery logic 190 may trigger the recovery operation.

The microprocessor 118 (or the embedded code 158) may record the detection of information indicative of an adverse event in logs, e.g., log information associated with the adverse event. The microprocessor 118 (or the embedded code 158) may further initiate the recovery operation in response to detection of the adverse event.

According to still further embodiments, under normal operation, the NVM IC device 110 periodically trains a prediction model with the measured metrics from the above methods of detecting a certain number or a certain type of accesses by the host microcontroller 102, or for detecting an adverse event, using machine learning to learn the normal patterns of accesses, watchdog timing, and environmental conditions that do not warrant immediate recovery action. The NVM IC device 110 may maintain (e.g., store) the prediction model to allow for observations of long-term and power-cycling-related patterns. The pattern within the prediction model may then be used to detect later anomalous behavior by inference and initiate recovery.

Figure 2A:
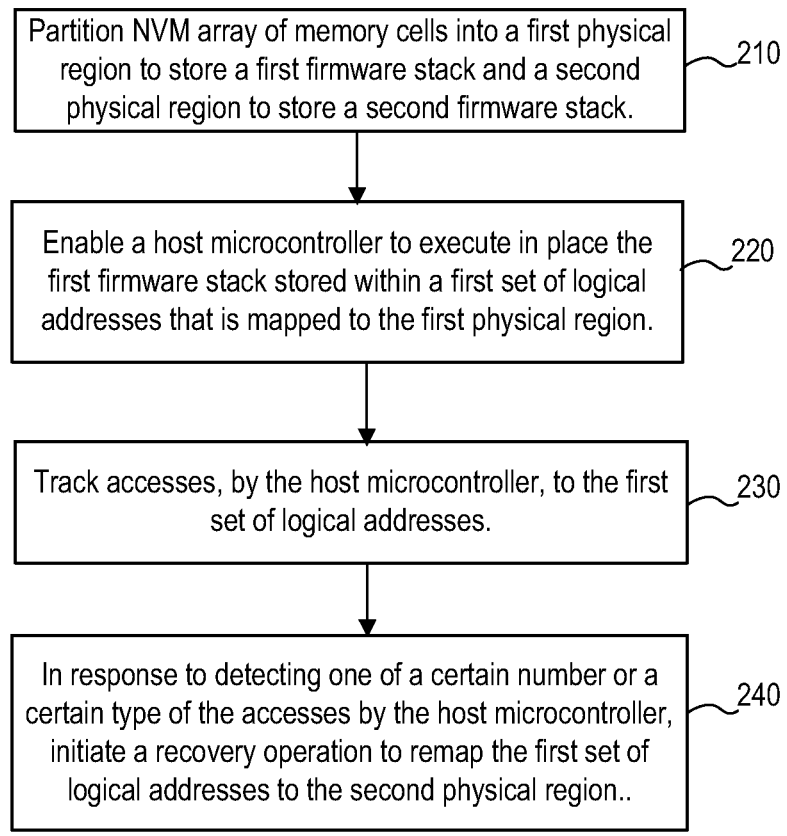
FIG. 2A is a flow diagram of a method for making the NVM integrated circuit device resilient to cyber-attack and malfunction, according to an embodiment.

FIG. 2A is a flow diagram of a method 200 for making the NVM integrated circuit device resilient to cyber-attack and malfunction, according to an embodiment. The method 200 may be performed by processing logic that may comprise hardware (e.g., circuitry, dedicated logic, programmable logic, microcode, etc.), software (such as instructions run on a processing device), firmware, or a combination thereof. In one embodiment, the method 200 is performed by the NVM integrated circuit device 110, and more specifically by the microprocessor 118 (e.g., processing device) of the NVM integrated circuit device 110.

With reference to FIG. 2A, at operation 210, the processing logic partitions the NVM array 120 of memory cells into a first physical region 124A to store a first firmware stack and a second physical region 124B to store a second firmware stack. At operation 220, the processing logic enables the host microcontroller to execute in place the first firmware stack stored within a first set of logical addresses 122A that is mapped to the first physical region 124A. At operation 230, the processing logic tracks accesses, by the host microcontroller, to the first set of logical addresses 122A. At operation 240, the processing logic, in response to detecting one of a certain number or a certain type of the accesses by the host microcontroller 102, initiate a recovery operation that includes to remap the first set of logical addresses 122A (in the first logical position) to the second physical region 124B.

Figure 2B:
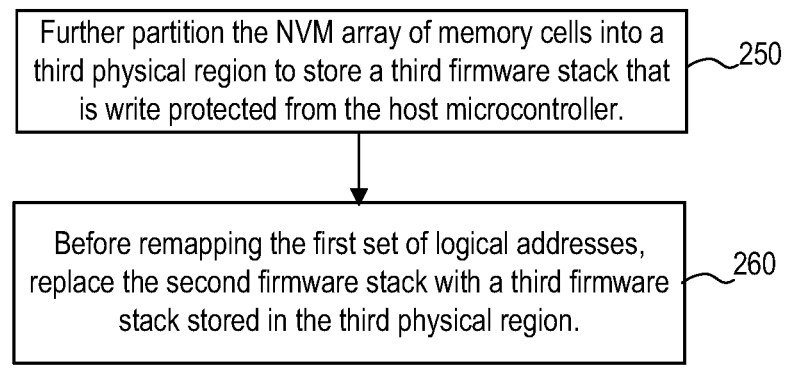
FIG. 2B is a flow diagram of an optional extension to the method of FIG. 2A according to an embodiment.

FIG. 2B is a flow diagram of an optional extension to the method 200 of FIG. 2A according to an embodiment. At operation 250, the processing logic further partitions the NVM array 120 of memory cells into a third physical region 124C to store a third firmware stack that is write protected from the host microcontroller 102. A operation 260, the processing logic, before remapping the first set of logical addresses to the second physical region 124B, replaces the second firmware stack with a third firmware stack that is stored in the third physical region. This replacement may be performed by writing the third firmware stack into the physical addresses where the second firmware stack was previously stored in the second physical region 124B.

Figure 3A:
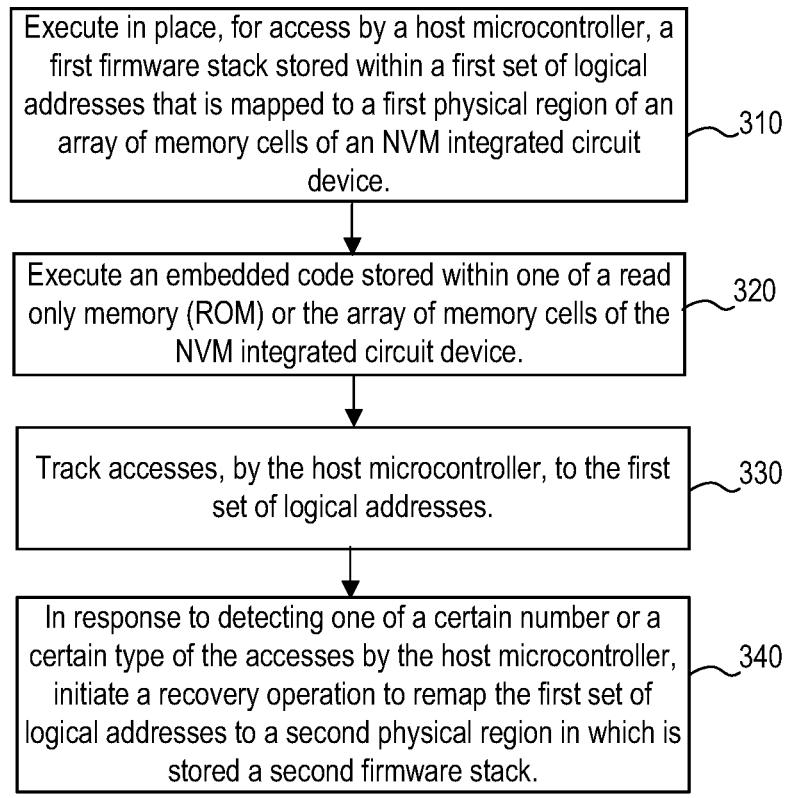
FIG. 3A is a flow diagram of a method for making the NVM integrated circuit device resilient to cyber-attack and malfunction, according to another embodiment.

FIG. 3A is a flow diagram of a method 300 for making the NVM integrated circuit device resilient to cyber-attack and malfunction, according to another embodiment. The method 300 may be performed by processing logic that may comprise hardware (e.g., circuitry, dedicated logic, programmable logic, microcode, etc.), software (such as instructions run on a processing device), firmware, or a combination thereof. In one embodiment, the method 300 is performed by the NVM integrated circuit device 110, and more specifically by execution of the embedded code 158 of the NVM integrated circuit device 110.

With reference to FIG. 3A, at operation 310, the processing logic executes in place, for access by a host microcontroller, a first firmware stack stored within a first set of logical addresses 122A that is mapped to a first physical region 124A of an array of memory cells of an NVM integrated circuit device, e.g., the NVM IC device 110. At operation 320, the processing logic executes the embedded code 158 stored within one of a read only memory (ROM) or the array of memory cells of the NVM integrated circuit device. Executing the embedded code may include, at operation 330, the processing logic tracking accesses, by the host microcontroller 102, to the first set of logical addresses 122A, and at operation 340, in response to detecting one of a certain number or a certain type of the accesses by the host microcontroller, the processing logic initiating a recovery operation that includes remapping the first set of logical addresses 122A to a second physical region 124B in which is stored a second firmware stack.

Figure 3B:
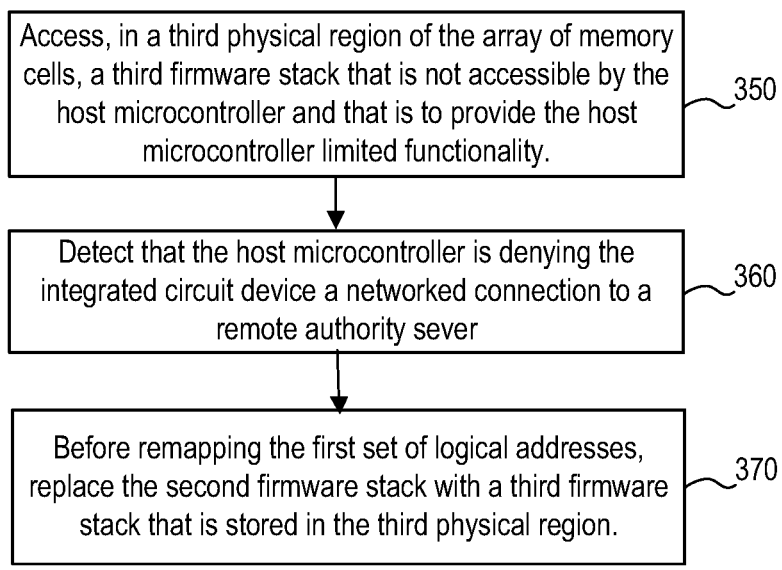
FIG. 3B is a flow diagram of an optional extension to the method of FIG. 2A according to an embodiment.

FIG. 3B is a flow diagram of an optional extension to the method 300 of FIG. 2A according to an embodiment. At operation 350, the processing logic accesses, in a third physical region 124C of the array of memory cells, a third firmware stack that is not accessible by the host microcontroller 102 and that is to provide the host microcontroller limited functionality. At operation 360, the processing logic detects that the host microcontroller 102 is denying the NVM integrated circuit device a networked connection to a remote authority sever. At operation 370, the processing logic, before remapping the first set of logical addresses 122A to the second physical region 124B, replaces the second firmware stack with a third firmware stack that is stored in the third physical region 124C. This replacement may be performed by writing the third firmware stack into the physical addresses where the second firmware stack was previously stored in the second physical region 124B.

Figure 4:
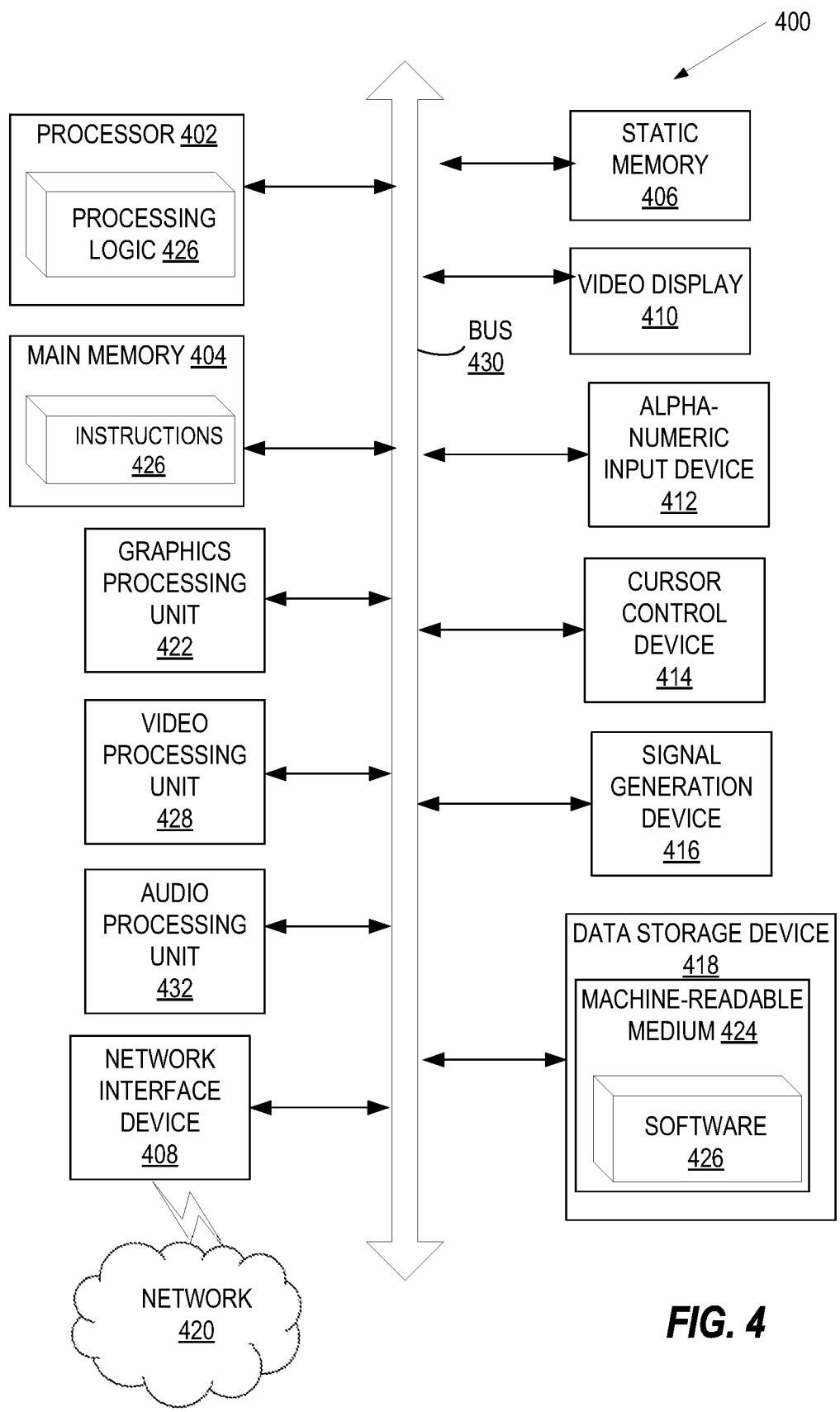
FIG. 4 illustrates a diagrammatic representation of a machine in the example form of a computing system within which a set of instructions, for causing the machine to perform any one or more of the methodologies discussed herein, may be executed.

FIG. 4 illustrates a diagrammatic representation of a machine in the example form of a computing system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a host computing system or computer, an automotive computing device, a server, a network device for an automobile network such as a controller area network (CAN) or local interconnected network (LIN), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections may be implemented in computing system 400.

The computing system 400 includes a processing device 402, main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor device, central processing unit, or the like processing device. More particularly, the processing device may be complex instruction set computing (CISC) microprocessor device, reduced instruction set computer (RISC) microprocessor device, very long instruction word (VLIW) microprocessor device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. In one implementation, processing device 402 may include one or more processing device cores. The processing device 402 is configured to execute instructions 426 for performing the operations discussed herein. In one implementation, processing device 402 may be part of the system 100 of FIG. 1A, FIG. 1B, or FIG. 1C.

Alternatively, the computing system 400 may include other components as described herein. The computing system 400 may further include a network interface device 408 communicably coupled to a network 420. The computing system 400 also may include a video display unit 410 (e.g., a liquid crystal display (LCD)), an alphanumeric input device 412 (e.g., a keyboard), a cursor control device 414 (e.g., a mouse), a signal generation device 416 (e.g., a speaker), or other peripheral devices. Furthermore, computing system 400 may include a graphics processing unit 422, a video processing unit 428 and an audio processing unit 432. In another implementation, the computing system 400 may include a chipset (not illustrated), which refers to a group of integrated circuits, or chips, that are designed to work with the processing device 402 and controls communications between the processing device 402 and external devices. For example, the chipset may be a set of chips on a motherboard that links the processing device 402 to very high-speed devices, such as main memory 404 and graphic controllers, as well as linking the processing device 402 to lower-speed peripheral buses of peripherals, such as USB, PCI, or ISA buses.

The data storage device 418 may include a computer-readable storage medium 424 on which is stored instructions 426 embodying any one or more of the methodologies of functions described herein. The instructions 426 may also reside, completely or at least partially, within the main memory 404 as instructions 426 and/or within the processing device 402 as processing logic during execution thereof by the computing system 400; the main memory 404 and the processing device 402 also constituting computer-readable storage media.

The computer-readable storage medium 424 may also be used to store instructions 426 utilizing the processing device 402, such as described with respect to FIGS. 1A-1C, and/or a software library containing methods that call the above applications. While the computer-readable storage medium 424 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the implementations. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus for performing the operations herein. This apparatus may be specially constructed for the required purposes, or it may comprise a general-purpose hardware selectively activated or reconfigured by a firmware stored therein. Such firmware may be stored in a non-transitory computer-readable storage medium, such as, but not limited to, NVMs, read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding or carrying a set of instructions for execution by the hardware and that causes the hardware to perform any one or more of the methodologies of the present embodiments. The term "computer-readable storage medium" shall accordingly be taken to include, but not be limited to, solid-state memories, optical media, electromagnetic media, any medium that is capable of storing a set of instructions for execution by hardware and that causes the hardware to perform any one or more of the methodologies of the present embodiments.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

What is claimed is:

1. A non-volatile memory (NVM) integrated circuit device comprising:
   an NVM array of memory cells, the NVM array partitioned into a first physical region to store a first firmware stack and a second physical region to store a second firmware stack; and
   a processing device coupled to the NVM array, the processing device to:
      enable a host microcontroller to execute in place the first firmware stack based on a first set of logical addresses that is mapped to the first physical region;
      track accesses to the first set of logical addresses;
      detect a certain number of the accesses or a certain type of the accesses; and
      in response to detecting one of the certain number of the accesses or the certain type of the accesses, initiate a recovery operation to remap the first set of logical addresses to the second physical region.

2. The NVM integrated circuit device of claim 1, wherein the second firmware stack is executed in place to resolve an unexpected event detected during the execution of the first firmware stack.

3. The NVM integrated circuit device of claim 1 wherein, after the recovery operation is complete, the processing device is further to remap the first set of logical addresses back to the first physical region in order to enable the host microcontroller to execute a reset of the first firmware stack stored therein.

4. The NVM integrated circuit device of claim 1 wherein, after the first set of logical addresses is remapped to the second physical region, the second firmware stack is locked to prevent writing thereto.

5. The NVM integrated circuit device of claim 1, wherein the processing device is further to:
   detect the certain number of the accesses based on a counter coupled to the processing device; and
   reset the counter only in response to a cryptographically authenticated request received from a remote authority server.

6. The NVM integrated circuit device of claim 1, wherein the NVM integrated circuit device is a system-on-chip (SoC) device.

7. The NVM integrated circuit device of claim 1, wherein the NVM array further comprises a third physical region to store a third firmware stack that is write protected from the host microcontroller.

8. The NVM integrated circuit device of claim 7, wherein prior to the recovery operation, the processing device is further to perform one or more of:
perform a hash-based validation of the second firmware stack against the third firmware stack; and
replace the second firmware stack with the third firmware stack.

9. The NVM integrated circuit device of claim 1, wherein the processing device is to initiate the recovery operation in response to detection of one of an unapproved access by the host microcontroller or a malfunction of the NVM integrated circuit device.

10. The NVM integrated circuit device of claim 9, wherein the detection is based on execution reports generated by using one or more of:
the certain number of accesses that are tracked against a range of logical addresses, of the first set of logical addresses, identified as being of interest; and
a self-consistency model based on comparison of boot or non-boot runtime behavior and abnormal runtime behavior.

11. A method of operating a non-volatile memory (NVM) integrated circuit device, the method comprising:
executing in place, by a host microcontroller, a first firmware stack stored within a first physical region of an NVM array of memory cells, wherein a first set of logical addresses is mapped to the first physical region; and
executing recovery logic, wherein executing the recovery logic comprises:
tracking accesses to the first set of logical addresses by the host microcontroller;
detecting a certain number of the accesses or a certain type of the accesses; and
in response to detecting one of the certain number of the accesses or the certain type of the accesses, initiating a recovery operation that comprises remapping the first set of logical addresses to a second physical region of the NVM array, wherein the second physical region stores a second firmware stack.

12. The method of claim 11, wherein a third physical region of the NVM array stores a third firmware stack that is not accessible by the host microcontroller, and wherein the method further comprises:
detecting that the host microcontroller is denying the NVM integrated circuit device a networked connection to a remote authority sever; and
prior to initiating the recovery operation, replacing the second firmware stack with the third firmware stack from the third physical region.

13. The method of claim 11, wherein a third physical region of the NVM array stores a third firmware stack that is not accessible by the host microcontroller, and wherein the method further comprises, prior to initiating the recovery operation, performing a hash-based validation of the second firmware stack against the third firmware stack.

14. The method of claim 11, further comprising securing, using cryptographic operations, read requests and write requests directed to the first set of logical addresses.

15. The method of claim 11, wherein detecting the certain type of the accesses comprises determining the amount of data read out of the NVM array since boot up.

16. The method of claim 11, wherein executing the recovery logic is performed by executing an embedded code stored within one of a read only memory (ROM) or the NVM array.

17. The method of claim 11, further comprising executing in place the second firmware stack by the host microcontroller.

18. The method of claim 17, further comprising:
receiving a reset of the first firmware stack from a remote authority server, as part of the recovery operation; and
remapping the first set of logical addresses back to the first physical region in order to enable to host microcontroller to execute the reset of the first firmware stack stored therein.

19. The method of claim 11, wherein executing the recovery logic comprises initiating the recovery operation in response to detecting one of an unapproved access by the host microcontroller or a malfunction of the NVM integrated circuit device.

20. The method of claim 19, wherein detecting one of the unapproved access by the host microcontroller or the malfunction of the NVM integrated circuit device comprises one or more of:
tracking the certain number of the accesses against a range of logical addresses, of the first set of logical addresses, identified as being of interest; and
executing a self-consistency model based on comparison of boot or non-boot runtime behavior and abnormal runtime behavior.

* * * * *